(12) United States Patent
Cho

(10) Patent No.: US 12,505,956 B2
(45) Date of Patent: Dec. 23, 2025

(54) ELECTRONIC COMPONENT

(71) Applicant: SAMSUNG ELECTRO-MECHANICS CO., LTD., Suwon-si (KR)

(72) Inventor: Beomjoon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 140 days.

(21) Appl. No.: 18/592,258

(22) Filed: Feb. 29, 2024

(65) Prior Publication Data

US 2024/0331947 A1     Oct. 3, 2024

(30) Foreign Application Priority Data

Mar. 28, 2023   (KR) .................. 10-2023-0040446

(51) Int. Cl.
| | |
|---|---|
| H01G 4/30 | (2006.01) |
| H01G 2/06 | (2006.01) |
| H01G 4/008 | (2006.01) |
| H01G 4/012 | (2006.01) |
| H01G 4/12 | (2006.01) |
| H01G 4/232 | (2006.01) |
| H01G 4/38 | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS

| | | | |
|---|---|---|---|
| 8,902,565 B2 * | 12/2014 | McConnell | B23K 1/203 |
| | | | 361/306.3 |
| 9,472,342 B2 * | 10/2016 | McConnell | B23K 35/0227 |
| 2014/0290998 A1 * | 10/2014 | Ahn | H01G 4/248 |
| | | | 361/301.4 |

(Continued)

FOREIGN PATENT DOCUMENTS

| | | | | |
|---|---|---|---|---|
| CN | 109216030 A | * | 1/2019 | ............. H01C 13/02 |
| JP | 11-354368 A | | 12/1999 | |

(Continued)

OTHER PUBLICATIONS

Extended European Search Report dated May 27, 2025, issued in corresponding European Patent Application No. 24165755.0.

*Primary Examiner* — Dion R. Ferguson
(74) *Attorney, Agent, or Firm* — Morgan Lewis & Bockius LLP

(57) ABSTRACT

An electronic component includes: a first capacitor; and at least one second capacitor that is disposed on the first capacitor along a stacking direction. Each of the first capacitor and the second capacitor includes a dielectric layer and a plurality of internal electrodes spaced apart from each other with the dielectric layer interposed therebetween and disposed in the stacking direction. A distance between the plurality of internal electrodes according to the stacking direction in the first capacitor is greater than a distance between the plurality of internal electrodes according to the stacking direction in the second capacitor.

17 Claims, 13 Drawing Sheets

(56) References Cited

U.S. PATENT DOCUMENTS

| | | | | |
|---|---|---|---|---|
| 2016/0104577 A1* | 4/2016 | Cho | .................... | H01G 4/2325 |
| | | | | 156/60 |
| 2019/0066919 A1* | 2/2019 | Son | ...................... | H01G 4/38 |
| 2019/0157004 A1* | 5/2019 | Park | ...................... | H01G 4/232 |
| 2020/0006003 A1* | 1/2020 | Jeong | ................... | H01G 4/008 |
| 2022/0139629 A1* | 5/2022 | Cho | ..................... | H01G 4/38 |
| | | | | 361/301.4 |
| 2024/0331947 A1* | 10/2024 | Cho | ..................... | H01G 4/30 |

FOREIGN PATENT DOCUMENTS

| | | | | | |
|---|---|---|---|---|---|
| JP | 2012043947 A | * | 3/2012 | ............. | H01G 4/30 |
| JP | 2014-225697 A | | 12/2014 | | |
| JP | 6927532 B1 | | 3/2019 | | |
| KR | 20160014301 A | * | 2/2016 | ............. | H01G 4/30 |
| KR | 10-2019-0012888 A | | 2/2019 | | |
| KR | 102048094 B1 | * | 11/2019 | ............. | H01G 4/30 |

\* cited by examiner

ELECTRONIC COMPONENT

CROSS-REFERENCE TO RELATED APPLICATION

This application claims priority to and the benefit of Korean Patent Application No. 10-2023-0040446 filed in the Korean Intellectual Property Office on Mar. 28, 2023, the entire contents of which are incorporated herein by reference.

BACKGROUND

(a) Technical Field

The present disclosure relates to an electronic component. More particularly, the present disclosure relates to a multi-layered ceramic capacitor.

(b) Description of the Related Art

In general, a multi-layered ceramic capacitor (MLCC) is a chip-type capacitor that is mounted on a circuit board of various electronic products and serves to charge or discharge electricity, and is formed of a structure in which internal electrodes of polarity are alternately stacked one by one with a ceramic layer in between.

Such a multi-layered ceramic capacitor is advantageous for down-size, and it is possible to realize high-capacity because the capacitance can be increased in proportion to the number of layers of ceramic layers and internal electrodes. Recently, the usage of multi-layered ceramic capacitors is increasing according to the trend of high performance and multifunctionality of electronic products. However, as the down-size and integration of electronic products progress, a mounting space of multi-layered ceramic capacitors is becoming increasingly limited.

In addition, multi-layered ceramic capacitors may generate vibration when a voltage is applied due to the piezoelectric and electrostrictive effects of the ceramic layer, and the generated vibration may be amplified through the board to generate acoustic noise. In addition, acoustic noise may also be generated by the resonance of the board. Since the acoustic noise of the multi-layered ceramic capacitor is proportional to the capacitance, the higher-capacity is implemented, the larger the acoustic noise, which affects user convenience.

SUMMARY

One aspect of an embodiment is to provide an electronic component that can implement high-capacity in a limited space and improve user convenience by suppressing vibration noise.

However, the problem to be solved by the embodiments of the present disclosure is not limited to the above-described problem and can be variously expanded in the range of technical ideas included in the present disclosure.

An electronic component according to an embodiment includes: a first capacitor; and at least one second capacitor that is disposed on the first capacitor along a stacking direction. Each of the first capacitor and the at least one second capacitor includes a dielectric layer and a plurality of internal electrodes spaced apart from each other with the dielectric layer interposed therebetween and disposed in the stacking direction. Along the stacking direction, a distance between the plurality of internal electrodes in the first capacitor is greater than a distance between the plurality of internal electrodes in the second capacitor.

The dielectric layer included in the first capacitor may have a lower permittivity than the dielectric layer included in the at least one second capacitor.

The plurality of internal electrodes in each of the first capacitor and the at least one second capacitor may include first internal electrodes and second internal electrodes alternately disposed in the stacking direction. Each of the first capacitor and the at least one second capacitor may include a first external electrode connected to the first internal electrodes and a second external electrode connected to the second internal electrodes.

The electronic component may further include a board and a lead terminal that may connect the first external electrode and the second external electrode included in the first capacitor to the board.

The electronic component may further include a board and a pair of frame terminals connected to the board. The first external electrodes and the second external electrodes may be coupled to the pair of frame terminals. The first capacitor may be disposed at a distance from the board in the stacking direction.

The first external electrode included in the first capacitor may be spaced apart from the first external electrode included in the at least one second capacitor.

The electronic component may further include a board and a lead terminal that may connect the first external electrode and the second external electrode included in the first capacitor to the board. The dielectric layer included in the first capacitor may have a lower permittivity than the dielectric layer included in the at least one second capacitor.

The electronic component may further include a board and a pair of frame terminals connected to the board. The first external electrodes and the second external electrodes may be coupled to the pair of frame terminals. The first capacitor may be disposed at a distance from the board in the stacking direction. The dielectric layer included in the first capacitor may have a lower permittivity than the dielectric layer included in the at least one second capacitor.

An electronic component according to another embodiment includes: a plurality of capacitors disposed in a stacking direction; and a connection portion that electrically connects the plurality of capacitors. Each of the plurality of capacitors includes a dielectric layer and a plurality of internal electrodes spaced apart from each other with the dielectric layer interposed therebetween and disposed in the stacking direction. along the stacking direction and among the plurality of capacitors, a distance between the plurality of internal electrodes in an uppermost capacitor is smaller than a distance between the plurality of internal electrodes in a remaining capacitor.

The remaining capacitor may include a single capacitor. On the other hand, the remaining capacitor may include two or more capacitors.

The dielectric layer included in the uppermost capacitor may have a higher permittivity than the dielectric layer included in the remaining capacitor.

The plurality of internal electrodes may include first internal electrodes and second internal electrodes alternately disposed in the stacking direction, and each of the plurality of capacitors may include a first external electrode connected to the first internal electrodes and a second external electrode connected to the second internal electrodes.

The electronic component may further include a board and a lead terminal that may connect the board to both the first external electrode and the second external electrode included in the capacitor, among the plurality of capacitors, closest to the board.

The electronic component may further include a board and a pair of frame terminals connected to the board. The first external electrodes and the second external electrodes may be coupled to a pair of frame terminals. Among the plurality of capacitors, the capacitor closest to the board may be disposed at a distance from the board in the stacking direction.

The connection portion may physically separate the first external electrode included in the capacitor, among the plurality of capacitors, closest to the board from the first external electrode included in a remaining capacitor.

The electronic component according to the embodiment can achieve high-capacity in a limited space by to the stacked structure of the capacitor, and can reduce vibration noise depending on the structural differentiation between a plurality of capacitors.

DETAILED DESCRIPTION

Figure 1:
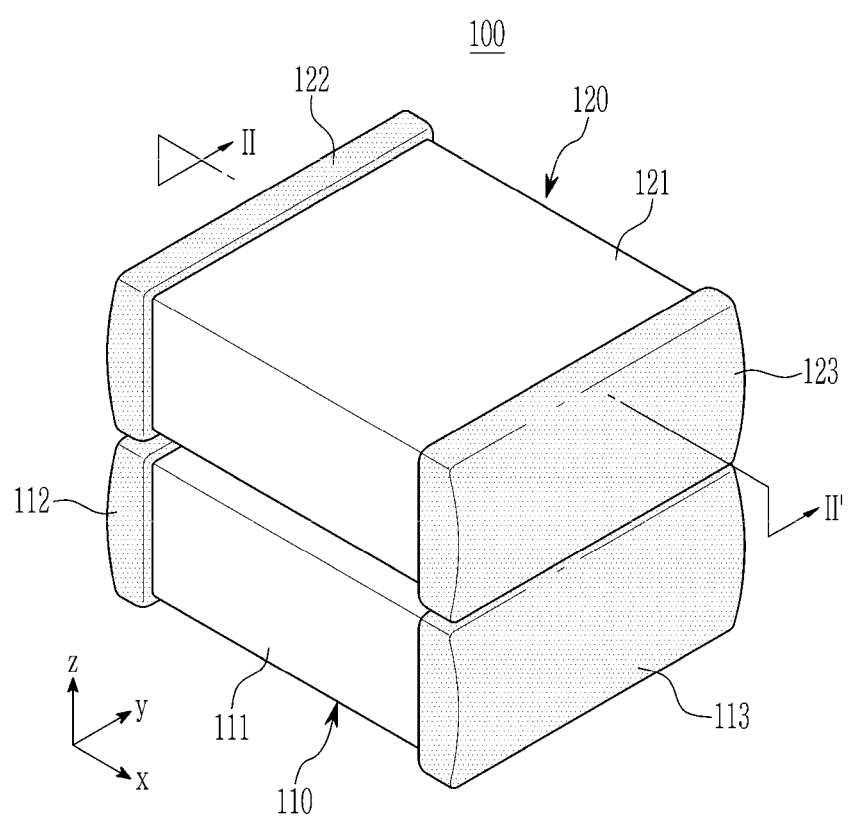
FIG. 1 is a perspective view of an electronic component according to an embodiment.

Hereinafter, an embodiment will be described in detail such that a person of an ordinary skill can easily practice it in the technical field to which the present disclosure belongs with reference to the accompanying drawing. In order to clearly explain the present disclosure in the drawings, parts irrelevant to the description are omitted, and the same reference numerals are attached to the same or similar constituent elements throughout the specification. In addition, in the accompanying drawing, some constituent elements are exaggerated, omitted, or schematically shown, and the size of each constituent element does not entirely reflect the actual size.

The accompanying drawings are only provided for easy understanding of the embodiments disclosed in this specification, and the technical ideas disclosed in this specification are not limited by the accompanying drawings, and it should be understood to include all modifications, equivalents and substitutes falling within the spirit and scope of the present disclosure.

Terms containing ordinal numbers, such as first, second, and the like may be used to describe various configurations elements, but the constituent elements are not limited by the terms. The terms are only used for the purpose of distinguishing one constituent element from another.

In addition, when a part such as a layer, film, region, plate, etc. is said to be "on" or 'on' another part, this includes the case where it is 'directly on' the other part and the case where there is another part in the middle. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

Throughout the specification, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Throughout the specification, "connected" does not mean only when two or more constituent elements are directly connected, but also when two or more constituent elements are indirectly connected through another constituent element, or when physically connected or electrically connected, and it may include a case in which substantially integral parts are connected to each other although they are referred to by different names according to positions or functions.

In describing an electronic component in this specification, a direction in which the components of the electronic component are stacked is defined as "stacking direction", but this may also be "thickness direction". In addition, a direction parallel to a plane vertical to the stacking direction may be defined as a "plane direction", and the plane direction may include a "first direction" and a "second direction" that are orthogonal to each other. The "first direction" may be defined as a "length direction", and the "second direction" may be defined as a "width direction".

Figure 2:
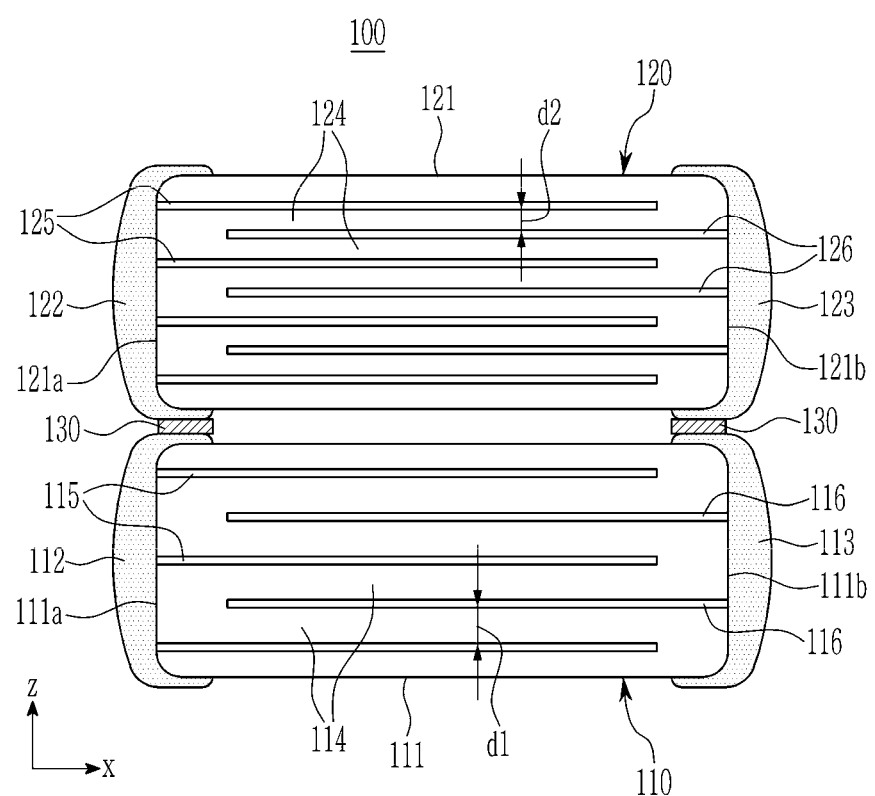
FIG. 2 is a cross-sectional view of the electronic component of FIG. 1, taken along the line II-II'.
Figure 3:
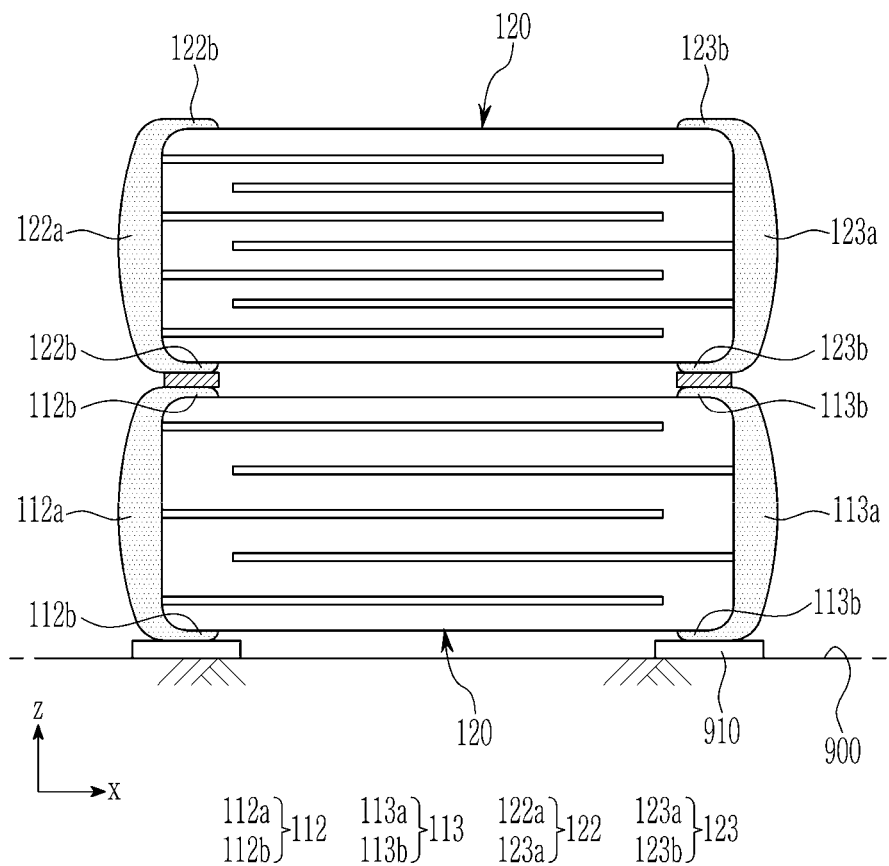
FIG. 3 is a cross-sectional view of a state in which the electronic component shown in FIG. 2 is mounted on a board.

FIG. 1 is a perspective view of an electronic component according to an embodiment. FIG. 2 is a cross-sectional view of the electronic component of FIG. 1, taken along the line II-II'. FIG. 3 is a cross-sectional view of a state in which the electronic component shown in FIG. 2 is mounted on a board.

Referring to FIG. 1 to FIG. 3, an electronic component 100 according to an embodiment is a multi-layered ceramic capacitor, and includes a first capacitor 110 and a second capacitor 120 that is disposed on the first capacitor 110 along a stacking direction (i.e., z-axis direction in the drawing).

The first capacitor 110 and the second capacitor 120 may respectively include capacitor bodies 111 and 121, and first external electrodes 112 and 122 and second external electrodes 113 and 123 that are disposed at opposite sides of the capacitor bodies 111 and 121 in a first direction (x-axis direction in the drawing).

The capacitor bodies 111 and 121 may include a plurality of dielectric layers 114 and 124, and a plurality of internal electrodes 115, 116, 125, and 126 disposed in the stacking direction spaced apart from each other with one dielectric layer 114 and 124 interposed therebetween. The plurality of internal electrodes 115, 116, 125, and 126 may include first internal electrodes 115 and 125 and second internal electrodes 116 and 126 alternately positioned in the stacking direction.

Figure 4:
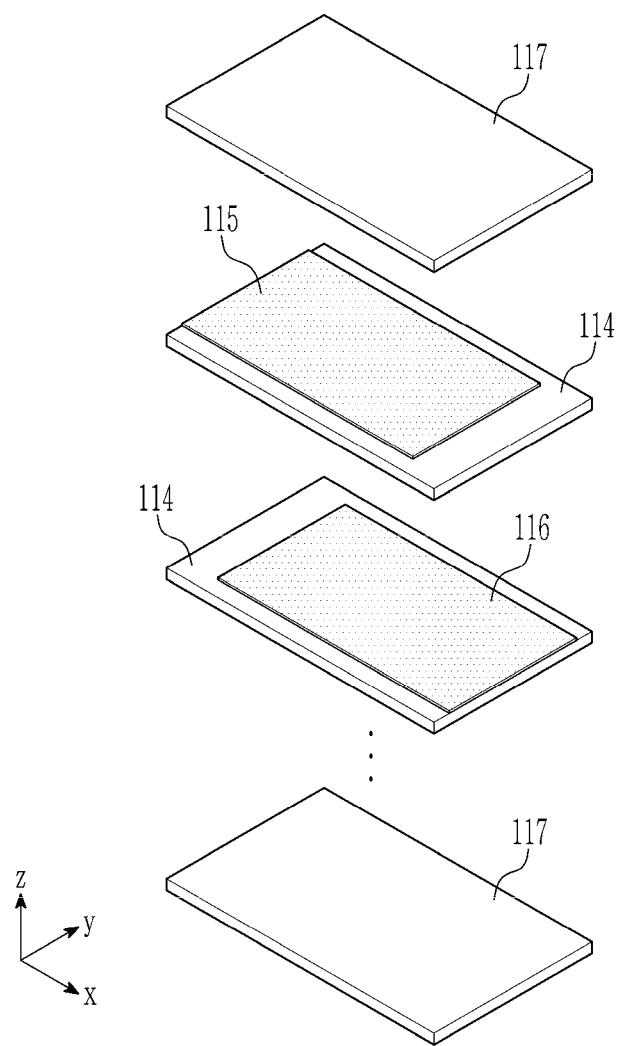
FIG. 4 is an exploded perspective view of a capacitor body of a first capacitor shown in FIG. 1.
Figure 5:
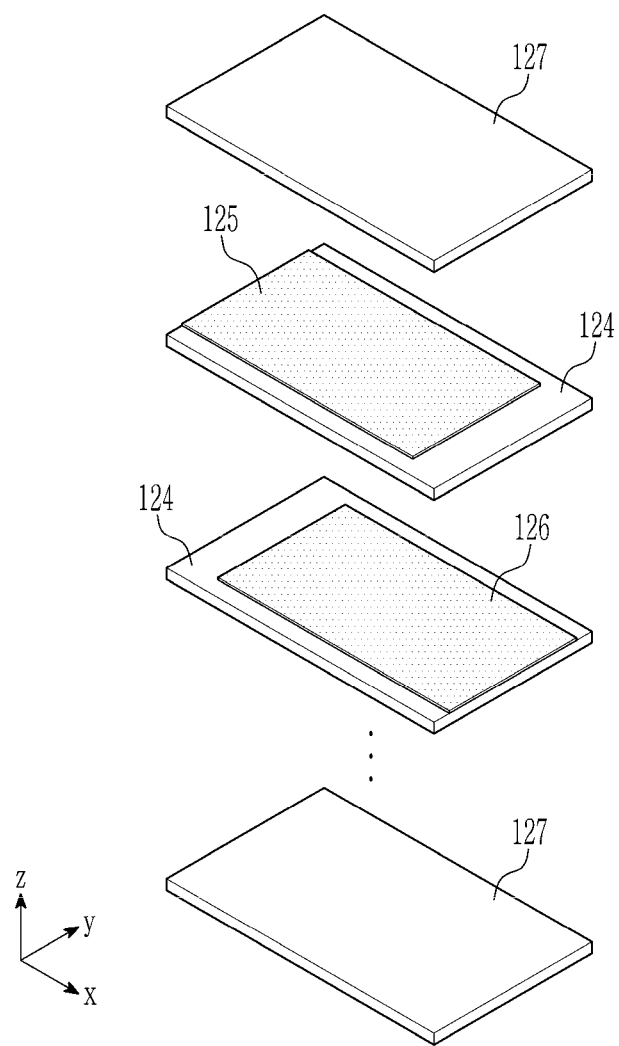
FIG. 5 is an exploded perspective view of a capacitor body of a second capacitor shown in FIG. 1.

FIG. 4 is an exploded perspective view of a capacitor body of a first capacitor shown in FIG. 1. FIG. 5 is an exploded perspective view of a capacitor body of a second capacitor shown in FIG. 1.

Referring to FIG. 4 and FIG. 5, the plurality of dielectric layers 114 and 124 may be disposed in a stacking direction, and any one of the first internal electrodes 115 and 125 and the second internal electrodes 116 and 126 may be disposed on each of the dielectric layers 114 and 124. The first internal electrodes 115 and 125 and the second internal electrodes 116 and 126 may be alternately disposed one by one along the stacking direction, and may have an area smaller than that of the dielectric layers 114 and 124.

One (left) edge of the first internal electrodes 115 and 125 may overlap with one (left) edge of both edges of the dielectric layers 114 and 124 according to the first direction, and the other (right) edge of the second internal electrodes 116 and 126 may overlap with the other (right) edge of both edges of the dielectric layers 114 and 124 according to the first direction. The capacitor bodies 111 and 121 may further include cover layers 117 and 127 positioned at both ends (top and bottom) according to the stacking direction, if necessary.

The capacitor bodies 111 and 121 may be manufactured by disposing the plurality of dielectric layers 114 and 124, the first internal electrodes 115 and 125, and the second internal electrodes 116 and 126 in the above-described configuration and then performing a sintering process. A boundary between the plurality of dielectric layers 114 and 124 in the capacitor bodies 111 and 121 that have undergone the firing process may be integrated to the extent that they cannot be confirmed without using a scanning electron microscope (SEM).

Referring back to FIG. 1 to FIG. 3, in the capacitor bodies 111 and 121, the dielectric layers 114 and 124 may include a ceramic material having a high permittivity. For example, the ceramic material may include a dielectric material ceramic containing a component such as $BaTiO_3$, $CaTiO_3$, $SrTiO_3$, or $GaZrO_3$. In addition, the ceramic material may further include auxiliary components such as Mn compound, Fe compound, Cr compound, Co compound, and Ni compound in addition to these components. For example, the ceramic material may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, and the like are partially employed in $BaTiO_3$-based dielectric material ceramic.

The capacitor bodies 111 and 121 may generally have a hexahedral shape, and may include first sides 111a and 121a and second sides 111b and 121b facing in a first direction. The first sides 111a and 121a and the second sides 111b and 121b may be left and right sides of the capacitor bodies 111 and 121.

The plurality of first internal electrodes 115 and 125 may be exposed from the first sides 111a and 121a of the capacitor bodies 111 and 121, and the plurality of second internal electrodes 116 and 126 may be exposed from the second sides 111b and 121b of the capacitor bodies 111 and 121. The first and second internal electrodes 115, 125, 116, and 126 include conductive metals, such as Ni, Cu, Ag, Pd, or Au, or their alloys, such as Ag—Pd alloy. In addition, the first and second internal electrodes 115, 125, 116, and 126 may further include dielectric material particles having the same composition as the ceramic material included in the dielectric layers 114 and 124.

The first external electrodes 112 and 122 extend from edges of base portions 112a and 122a covering the first sides 111a and 121a of the capacitor bodies 111 and 121, and band portions 112b and 122b extend toward the second side 111b and 121b from the edges of the base portion 112a and 122a to cover parts of upper and lower surfaces and parts of front and rear surfaces of the bodies 111 and 121. The second external electrodes 113 and 123 may include base portions 113a and 123a covering the second sides 111b and 121b of the capacitor bodies 111 and 121, and band portions 113b and 123b extending from the edges of the base portions 113a and 123a toward the first sides 111a and 121a and covering parts of upper and lower surfaces and parts of front and rear surfaces of the bodies 111 and 121.

The base portions 112a and 122a of the first external electrodes 112 and 122 contact the plurality of first internal electrodes 115 and 125 to be electrically connected to the plurality of first internal electrodes 115 and 125. The base portions 113a and 123a of the second external electrodes 113 and 123 contact the plurality of second internal electrodes 116 and 126 to be electrically connected to the plurality of second internal electrodes 116 and 126. The band portions 112b, 122b, 113b, and 123b function to increase the adhesion strength of the first and second external electrodes 112, 122, 113, and 123 to the capacitor bodies 111 and 121.

The first and second external electrodes 112, 122, 113, and 123 may be formed of a single film or a multilayer of two or more layers. For example, each of the first and second external electrodes 112, 122, 113, and 123 may have a two-layer structure of a first electrode layer and a second electrode layer covering the first electrode layer. The first electrode layer may be manufactured by a method such as dipping, printing, or transfer using conductive paste, and the second electrode layer may be manufactured by a method such as sputtering or plating.

For example, the conductive paste for manufacturing the first electrode layer may contain Cu as a main component, and may include at least one material of Ni, Sn, Pd, Pt, Au, Ag, W, Ti, Pb, or their alloys and glass powder. The first electrode layer may be manufactured by a method of dipping and drying the capacitor bodies 111 and 121 in conductive paste, a method of printing the conductive paste on the capacitor bodies 111 and 121 and drying it, a method of transferring a dry film of the conductive paste to the capacitor bodies 111 and 121, and the like.

The first electrode layer made using the conductive paste increases the density of the first and second external electrodes 112, 122, 113, and 123 while securing sufficient conductivity, and thus penetration of plating solution and/or external moisture in the manufacturing of the second electrode layer can be effectively suppressed.

The second electrode layer may include Ni as a main component, and may further include Cu, Sn, Pd, Pt, Au, Ag, W, Ti, Pb alone or an alloy thereof. The second electrode layer may be manufactured by methods such as sputtering or electrolytic plating, and serves to enhance the structural reliability, durability, and heat resistance of the first and second capacitors.

Voltages of opposite polarity may be provided to the first external electrodes 112 and 122 and the second external electrodes 113 and 123, and accordingly, the first internal electrodes 115 and 125 and the second internal electrodes 116 and 126 may have opposite polarity to each other. When a predetermined voltage is applied to the first and second external electrodes 112, 122, 113, and 123, charges are accumulated between the first internal electrodes 115 and 125 and the second internal electrodes 116 and 126. The capacitance of each of the first and second capacitors 110 and 120 is proportional to the overlapping area of the first and second internal electrodes 115, 125, 116, and 126 facing each other along the stacking direction.

The electronic component 100 includes a connection portion 130 that physically and electrically connects the first capacitor 110 and the second capacitor 120. The connection portion 130 may be formed of a conductive adhesive layer. The connection portion 130 is positioned between the first external electrodes 112 and 122 of the first and second capacitors 110 and 120 to connect and conduct electricity to the first external electrodes 112 and 122. In addition, the connection portion 130 is disposed between the second external electrodes 113 and 123 of the first and second capacitors 110 and 120 to connect and conduct electricity to the second external electrodes 113 and 123. The first and second capacitors 110 and 120 may be coupled in parallel by the connection portion 130.

The first capacitor 110 may be mounted on the board 900 by a lead terminal 910, and is disposed closest to the board 900 among a plurality of capacitors constituting the electronic component 100. The board 900 may be a printed circuit board for electronic products. The second capacitor 120 is an uppermost capacitor according to the stacking direction among the plurality of capacitors that form the electronic component 100, and is positioned further from the board 900 than the first capacitor 110. The electronic component 100 according to an embodiment may implement high-capacity in a space limited by the stacked structure of the first and second capacitors 110 and 120.

In the electronic component 100 according to an embodiment, the first capacitor 110 and the second capacitor 120 have different configurations. Specifically, a distance (a first distance d1) between the plurality of internal electrodes 115 and 116 according to the stacking direction in the first capacitor 110 is greater than a distance (second distance d2) between the plurality of internal electrodes 125 and 126 according to the stacking direction in the second capacitor 12.

That is, the distance d2 between the plurality of internal electrodes in the uppermost capacitor among the plurality of capacitors is smaller than the distance d1 between the plurality of internal electrodes in the other capacitor.

In this case, the first distance d1 may be an arithmetic mean value of distances between the plurality of internal electrodes 115 and 116 according to the stacking direction, and the second distance d2 may be an arithmetic mean value of distances between the plurality of internal electrodes 125 and 126 according to the stacking direction. The first distance d1 may be equal to an average thickness of the plurality of dielectric layers 114 included in the first capacitor 110, and the second distance d2 may be equal to an average thickness of the plurality of dielectric layers 124 included in the second capacitor 120. For the configuration described above, the average thickness of the plurality of dielectric layers 114 forming the first capacitor 110 may be greater than the average thickness of the plurality of dielectric layers 124 forming the second capacitor 120.

Materials of the dielectric layers 114 and 124 forming the capacitor bodies 111 and 121, for example, barium titanate ($BaTiO_3$), may vibrate when a voltage is applied due to piezoelectric effect and flexoelectric effect, and the generated vibration may be transmitted to the board 900 through the lead terminal 910. In this case, the board 900 serves as an acoustic emitter and may generate acoustic noise. In addition, when vibration is applied to the board 900 from the outside, the board 900 may cause resonance, and acoustic noise may also occur due to the resonance of the board 900.

In the electronic component 100 according to an embodiment, the first distance d1 is greater than the second distance d2. As the distance between the internal electrodes in the capacitor body increases, the potential of the corresponding dielectric layer decreases, and thus the vibration of the capacitor body due to voltage fluctuations also decreases. According to the differentiated structure of the first distance d1 and the second distance d2, the vibration noise of the first capacitor 110 close to the board 900 is reduced, which leads to the effect of reducing the vibration noise of the entire electronic component 100.

The first distance d1 may be approximately 1.2 to 2.5 times the second distance d2, for example, the first distance d1 may be approximately 1.5 times the second distance d2. When the first distance d1 is less than 1.2 times the second distance d2, it is difficult to implement the vibration noise reduction effect due to the increase in the distance between internal electrodes, and when the first distance d1 exceeds 2.5 times the second distance d2, the side effect of deteriorated capacity occurs more than the vibration noise reduction effect.

In addition, the dielectric layer 114 of the first capacitor 110 may have a permittivity lower than that of the dielectric layer 124 of the second capacitor 120 under, for example, essentially the same measurement conditions. Since the potential decreases as the permittivity of the dielectric layer decreases, the vibration of the capacitor body due to voltage fluctuation also decreases. The dielectric layers 114 and 124 may include main components such as $BaTiO_3$, $CaTiO_3$, $SrTiO_3$, $GaZrO_3$, and the like and auxiliary components such as Mn compound, Fe compound, Cr compound, and Ni compound, and the permittivity can be changed by controlling the content of the auxiliary components and the size and firing temperature of the sintered particles.

The first and second capacitors 110 and 120 may include the capacitor bodies 111 and 121 of the same thickness (thickness measured in the stacking direction), and the first capacitor 110 may include fewer internal electrodes than the second capacitor 120. Since the reduction in the number of internal electrodes causes deteriorated capacitance of the capacitor, it is not necessary to configure the entire plurality of capacitors forming the electronic component as the first capacitor 110. The electronic component 100 according to an embodiment can harmoniously implement both the effect of reducing vibration noise and the effect of implementing high-capacity by providing a differentiated structure of the first distance d1 and the second distance d2.

The above-mentioned first distance d1 and second distance d2 may be measured by preparing a cross-section sample (first direction-stacking direction cross-section) by cutting the capacitor bodies 111 and 121 in the first direction (x-axis direction) and the stacking direction (z-axis direction) at a center of in the second direction (y-axis direction in the drawing), and using a cross-section image obtained by observing the cross-section sample with a scanning electron microscope (SEM) or scanning transmission electron microscope (STEM). Other methods and/or tools appreciated by one of ordinary skill in the art, even if not described in the present disclosure, may also be used.

For example, an average thickness of the dielectric layer 114 may be obtained from the cross-section image obtained from the cross-section sample of the capacitor body 111, and this may be defined as the first distance d1. In addition, an average thickness of the dielectric layer 124 may be obtained from the cross-section image obtained from the cross-section sample of the capacitor body 121, and this may be defined as the second distance d2.

For the average thickness of the dielectric layers 114 and 124, a center point of the first direction (x-axis direction) or second direction (y-axis direction) of the dielectric layers 114 and 124 in the cross-section image is set as a reference point, and an arithmetic average value of thicknesses of the dielectric layers 114 and 124 at 10 points apart from the reference point by a predetermined distance may be the average thickness of the dielectric layers 114 and 124. Intervals of the 10 points may be adjusted according to the scale of the cross-section image, and may be, for example, 1 μm to 100 μm, 1 μm to 50 μm, or 1 μm to 10 μm. In this case, all 10 points should be positioned within the dielectric layer, and when all 10 points are not positioned within the dielectric layer, the position of the reference point may be changed or the interval between the 10 points may be adjusted.

Figure 6:
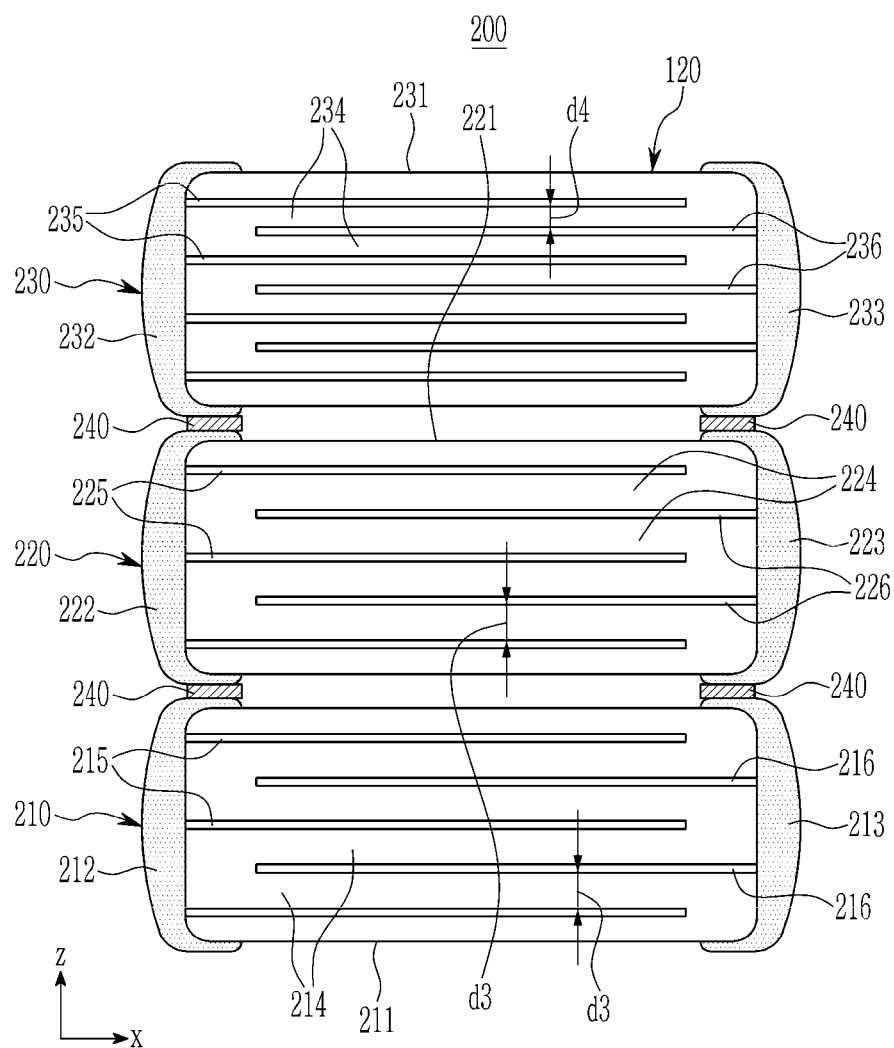
FIG. 6 is a cross-sectional view of an electronic component according to another embodiment.

FIG. 6 is a cross-sectional view of an electronic component according to another embodiment.

Referring to FIG. 6, an electronic component 200 according to another an embodiment includes a third capacitor 210, a fourth capacitor 220 disposed on the third capacitor 210 along a stacking direction, a fifth capacitor 230 disposed on the fourth capacitor 220 along the stacking direction, and a connection portion 240 that physically and electrically connects the third to fifth capacitors 210, 220, and 230.

The third to fifth capacitors 210, 220, and 230 may include capacitor bodies 211, 221, and 231, first external electrodes 212, 222, and 232 and second external electrodes 213, 223, and 233 disposed at both ends facing in the first direction of the capacitor bodies 211, 221, and 231, respectively.

The capacitor bodies 211, 221, and 231 may include a plurality of dielectric layer 214, 224, and 234 and a plurality of internal electrodes 215, 216, 225, 226, 235, and 236 spaced apart from each other with one dielectric layer 214, 224, and 234 interposed therebetween and arranged in the stacking direction. The plurality of internal electrodes 215, 216, 225, 226, 235, and 236 may include first internal electrodes 215, 225, and 235 and second internal electrodes 216, 226, and 236 alternately disposed in the stacking direction.

The connection portion 240 may be formed of a conductive adhesive layer. The connection portion 240 may be disposed between the first external electrodes 212, 222, and 232 of the third to fifth capacitors 210, 220, and 230 to connect and conduct electricity to the first external electrodes 212, 222, and 232, and may be disposed between the second external electrodes 213, 223, and 233 of the third to fifth capacitors 210, 220, and 230 to connect and conduct electricity to the second external electrodes 213, 223, and 233. The third to fifth capacitors 210, 220, and 230 may be coupled in parallel by the connection portion 240.

The third capacitor 210 may be mounted on a board (not shown), and may be disposed closest to the board among the plurality of capacitors forming the electronic component 200. The fifth capacitor 230 may be an uppermost capacitor according to the stacking direction among the plurality of capacitors forming the electronic component 200, and may be disposed farthest from the board among the plurality of capacitors.

In the electronic component 200 of the present embodiment, the uppermost capacitor and the remaining capacitors have different configurations. Specifically, a distance (third distance, d3) between the plurality of internal electrodes 215, 216, 225, 226 according to the stacking direction in the third and fourth capacitors 210 and 220 is larger than a distance (fourth distance, d4) between electrodes the plurality of internal electrodes 235 and 236 according to the stacking direction in the fifth capacitor 230. That is, the distance d4 between the plurality of internal electrodes 235 and 236 according to the stacking direction in the uppermost capacitor 230 is smaller than the distance d3 between the plurality of internal electrodes 215, 216, 225, and 226 according to the stacking direction in the other capacitors 210 and 220.

In this case, the third distance d3 may be an arithmetic mean value of the distances between the plurality of internal electrodes 215, 216, 225, and 226 according to the stacking direction, and the fourth distance d4 may be an arithmetic mean value of the distances between the plurality of internal electrodes 235 and 236 according to the stacking direction. The third distance d3 may be equal to an average thickness of the plurality of dielectric layers 214 and 224 included in the third and fourth capacitors 210 and 220, respectively, and the fourth distance d4 may be the same as an average thickness of the plurality of dielectric layers 234 included in the fifth capacitor 230.

For the configuration described above, the average thickness of the plurality of dielectric layers 214 and 224 forming the third and fourth capacitors 210 and 220 may be greater than the average thickness of the plurality of dielectric layers 234 forming the fifth capacitor 230. In addition, the dielectric layers 214 and 224 of the third and fourth capacitors 210 and 220 may have a permittivity lower than that of the dielectric layer 234 of the fifth capacitor 230.

The third distance d3 may be approximately 1.2 to 2.5 times the fourth distance d4, and for example, the third distance d3 may be approximately 1.5 times the fourth distance d4. When the third distance d3 is less than 1.2 times the fourth distance d4, it is difficult to implement the vibration noise reduction effect due to the increase in the distance between internal electrodes, and when the third distance d3 exceeds 2.5 times the fourth distance d4, the side effect of deteriorated capacity occurs more than the vibration noise reduction effect. Since the measurement method of the third distance d3 and the fourth distance d4 is the same as the measurement method of the first distance d1 and the second distance d2 described above, duplicate descriptions are omitted.

The third to fifth capacitors 210, 220, and 230 may include capacitor bodies 211, 221, and 231 of the same thickness (thickness measured in the stacking direction), and the fifth capacitor 230 may include more internal electrodes than the third and fourth capacitors 210 and 220. The capacitance of the fifth capacitor 230 is greater than that of each of the third and fourth capacitors 210, and 220. The third and fourth capacitors 210 and 220 may effectively reduce vibration noise caused by voltage fluctuations due to the increased distance between internal electrodes.

The electronic component 200 of the present embodiment can realize high-capacity in a limited space by increasing the number of stacked capacitors, and simultaneously reducing the vibration noise of the third and fourth capacitors 210 and 220 close to the board such that vibration noise of the entire electronic component 200 can be effectively reduced.

Figure 7:
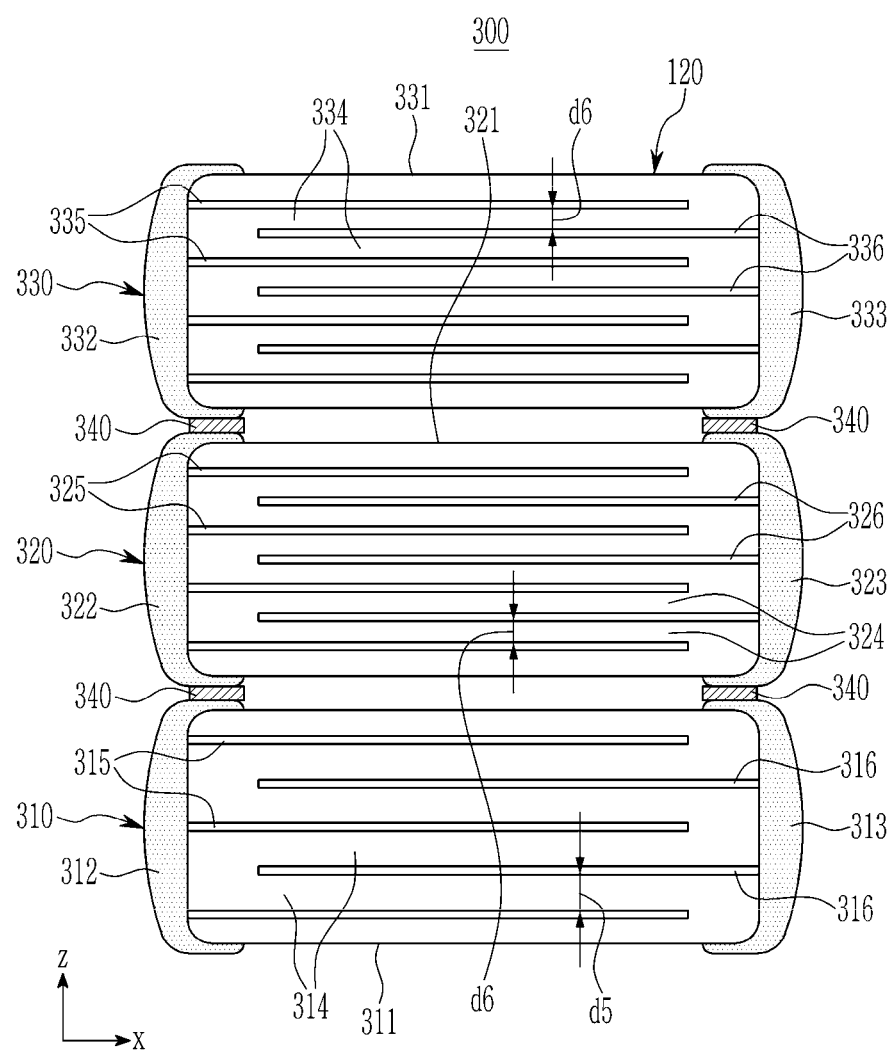
FIG. 7 is a cross-sectional view of an electronic component according to still another embodiment.

FIG. 7 is a cross-sectional view of an electronic component according to still another embodiment.

Referring to FIG. 7, an electronic component 300 according to another embodiment includes a sixth capacitor 310, a seventh capacitor 320 disposed on the sixth capacitor 310 along a stacking direction, an eighth capacitor 330 disposed on the seventh capacitor 320 along the stacking direction, and a connection portion 340 that physically and electrically connects the sixth to eighth capacitors 310, 320, and 330.

The sixth to eighth capacitors 310, 320, and 330 may respectively include capacitor bodies 311, 321, and 331, and first external electrodes 312, 322, and 332 and second external electrodes 313, 323, and 333 disposed at both ends facing each other in a first direction of the capacitor bodies 311, 321, and 331.

The capacitor bodies 311, 321, and 331 may include a plurality of dielectric layers 314, 324, and 334, and a plurality of internal electrodes 315, 316, 325, 326, 335, and 336 that are spaced apart from each other with one dielectric layer 314, 324, and 334 interposed therebetween and disposed in the stacking direction. The plurality of internal electrodes 315, 316, 325, 326, 335, and 336 may include first internal electrodes 315, 325, and 335 and second internal electrodes 316, 326, and 336 alternately disposed in the stacking direction.

The connection portion 340 may be formed of a conductive adhesive layer. The connection portion 340 may be disposed between the first external electrodes 312, 322, and 332 of the sixth to eighth capacitors 310, 320, and 330 to connect and conduct electricity to the first external electrodes 312, 322, and 332, and may be disposed between the second external electrodes 313, 323, and 333 of the sixth to eighth capacitors 310, 320, and 330 to connect and conduct electricity to the second external electrodes 313, 323, and 333. The sixth to eighth capacitors 310, 320, and 330 may be coupled in parallel by the connection portion 340.

The sixth capacitor 310 may be mounted on a board, and may be disposed closest to the board among a plurality of capacitors forming the electronic component 300. The seventh and eighth capacitors 320, and 330 are capacitors stacked on the sixth capacitor 310 and maybe disposed farther from the board than the sixth capacitor 310.

In the electronic component 300 of the present embodiment, the sixth capacitor 310 has a different configuration from the other capacitors 320 and 330. Specifically, a distance (fifth distance, d5) between the plurality of internal electrodes 315 and 316 according to the stacking direction in the sixth capacitor 310 is larger than a distance (sixth distance, d6) of the plurality of internal electrodes 325, 326, 335, and 336 according to the stacking direction in the seventh and eighth capacitors 320 and 330.

In this case, the fifth distance d5 may be an arithmetic mean value of the distances between the plurality of internal electrodes 315 and 316 according to the stacking direction, and the sixth distance d6 may be an arithmetic mean value of the distances between the plurality of internal electrodes 325, 326, 335, and 336 according to the stacking direction. The fifth distance d5 may be equal to an average thickness of the plurality of dielectric layers 314 included in the sixth capacitor 310, and the sixth distance d6 may be equal to an average thickness of the plurality of dielectric layers 324, and 334 included in the seventh and eighth capacitors 320, and 330.

For the configuration described above, the average thickness of the plurality of dielectric layers 314 forming the sixth capacitor 310 may be greater than the average thickness of the plurality of dielectric layers 324 and 334 forming the seventh and eighth capacitors 320 and 330. In addition, the dielectric layer 314 of the sixth capacitor 310 may have a permittivity lower than that of the dielectric layers 324 and 334 of the seventh and eighth capacitors 320 and 330.

The fifth distance d5 may be approximately 1.2 times to 2.5 times the sixth distance d6, for example, the fifth distance d5 may be approximately 1.5 times the sixth distance d6. When the fifth distance d5 is less than 1.2 times the sixth distance d6, it is difficult to implement the vibration noise reduction effect due to the increase in the distance between internal electrodes, and when the fifth distance d5 exceeds 2.5 times the sixth distance d6, the side effect of deteriorated capacity occurs more than the vibration noise reduction effect. Since the method of measuring the fifth distance d5 and the sixth distance d6 is the same as the method of measuring the first distance d1 and the second distance d2 described above, duplicate descriptions are omitted.

The sixth to eighth capacitors 310, 320, and 330 may include capacitor bodies 311, 321, and 331 of the same thickness (thickness measured in the stacking direction), and the seventh and eighth capacitors 320 and 330 may have more internal electrodes than the sixth capacitor 310. The capacitance of each of the seventh and eighth capacitors 320 and 330 is greater than that of the sixth capacitor 310.

The electronic component 300 of the present embodiment may effectively reduce vibration noise due to voltage fluctuation by increasing the distance d5 between the internal electrodes of the sixth capacitor 310. In addition, as the seventh and eighth capacitors 320 and 330 having higher capacitance than the sixth capacitor 310 are stacked and disposed on the sixth capacitor 310, high-capacity can be implemented in a limited space.

In the electronic components 100, 200, and 300 of the various embodiments described above, since the dielectric layer has the same thickness in one capacitor, manufacturing of the capacitor is facilitated and suitable for mass production.

Figure 8:
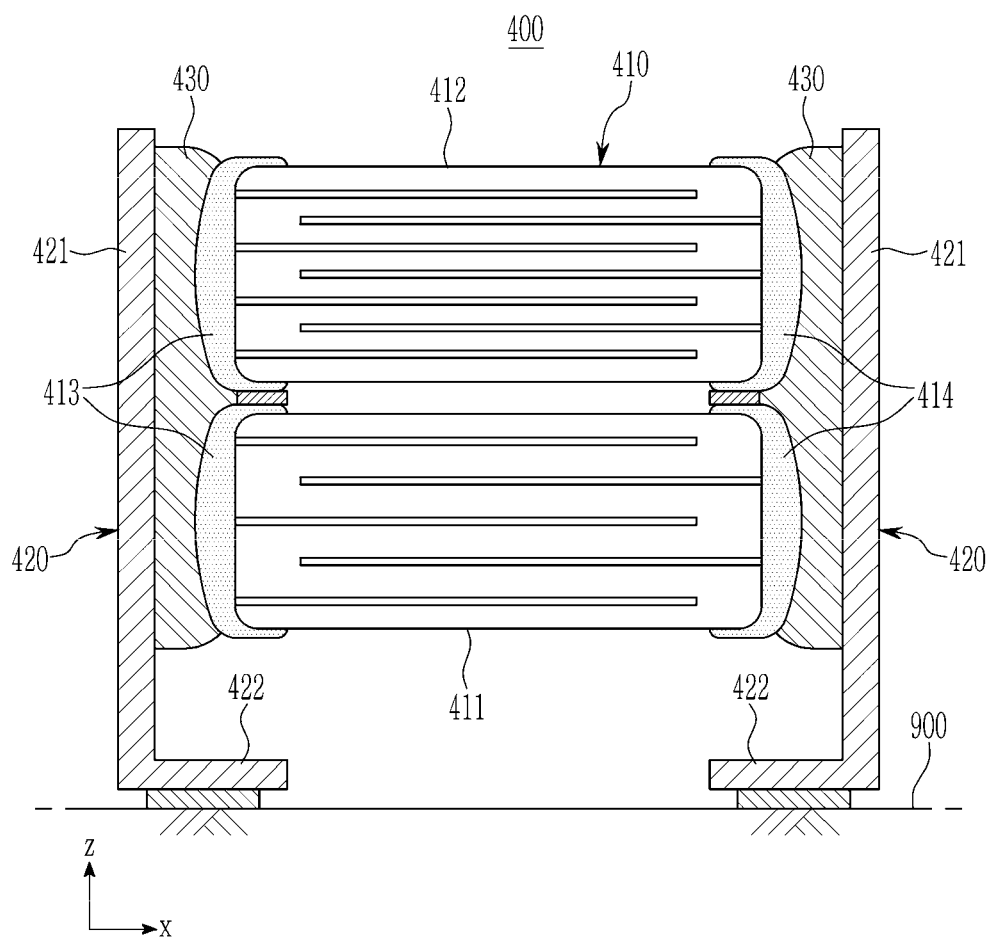
FIG. 8 is a cross-sectional view of an electronic component according to still another embodiment.

FIG. 8 is a cross-sectional view of an electronic component according to still another embodiment.

Referring to FIG. 8, an electronic component 400 according to another embodiment includes a multi-layered capacitor 410 and a pair of frame terminals 420 coupled to both ends facing each other in the first direction of the multi-layered capacitor 410. The pair of frame terminals 420 are connected to a board 900.

The multi-layered capacitor 410 may include a plurality of capacitors disposed in a stacking direction and a connection portion physically and electrically connecting the plurality of capacitors. Among the plurality of capacitors, a capacitor closest to the board 900 may have a different configuration from the rest of the capacitors. On the other hand, the uppermost capacitor positioned farthest from the board 900 among the plurality of capacitors may have a configuration different from the rest of the capacitors.

In the case of the former, a distance between a plurality of internal electrodes in a capacitor closest to the board 900 may be greater than a distance between a plurality of internal electrodes in the remaining capacitors. In this case, the capacitor closest to the board is advantageous in reducing vibration noise caused by voltage fluctuation, and the remaining capacitors are advantageous in securing high-capacity.

In the latter case, the distance between the plurality of internal electrodes in the uppermost capacitor may be smaller than the distance between the plurality of internal electrodes in the remaining capacitors. In this case, the uppermost capacitor is advantageous for securing high-capacity, and the remaining capacitors are advantageous for reducing vibration noise caused by voltage fluctuations.

FIG. 8 illustrates a case in which the multi-layered capacitor 410 is formed of two capacitors 411 and 412 as an example, but the number of capacitors is not limited to the illustrated example.

Each of the pair of frame terminals 420 may include a mounting portion 421 extending in the stacking direction and an installing portion 422 extending in a first direction from a lower end of the mounting portion 421. The pair of installing portions 422 may extend toward each other, and the pair of frame terminals 420 may have a substantially "L" shape. The mounting portions 421 may be connected to first and second external electrodes 413 and 414 of the multi-layered capacitor 410, and the installing portions 422 may be connected to the board 900.

The first and second external electrodes 413 and 414 may be fixed and connected to the mounting portions 421 by a conductive adhesive portion 430. The conductive adhesive portion 430 may include, for example, a conductive resin composition. The multi-layered capacitor 410 fixed between the pair of frame terminals 420 may be spaced apart from the board 900 at a predetermined distance along the stacking direction. The pair of frame terminals 420 may be made of metal, and the multi-layered capacitor 410 may be connected to the board through the pair of frame terminals 420.

Figure 9:
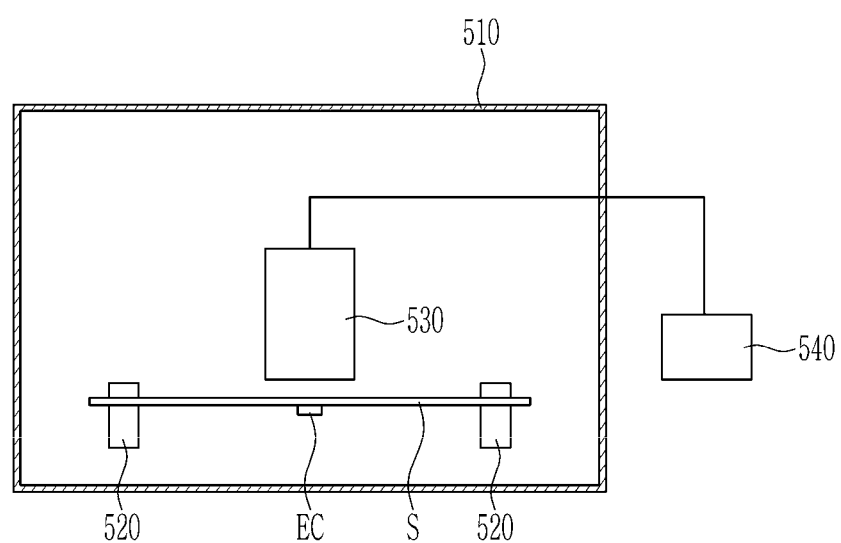
FIG. 9 is a schematic diagram of a measurement equipment for an acoustic noise experiment of electronic components.

FIG. 9 is a schematic diagram of a measurement equipment for an acoustic noise experiment of the electronic components.

Referring to FIG. 9, a measurement equipment includes an anechoic chamber 510, a support 520 disposed inside the anechoic chamber 510, a microphone 530, and a data collection system 540 connected to the microphone 530. A board S on which an electronic component EC is mounted is supported by the support 520, and the microphone 530 is disposed on the board S at a distance of 3 mm from the board S. A function generator not shown is connected to the board S.

Acoustic noise experiments were conducted on the electronic components of Embodiments 1 to 3 and the electronic components of Comparative Example 1 to 3 using the measurement equipment shown in FIG. 9. Experiment conditions are shown in the table below.

TABLE 1

| Vibration applied to the board | Sine wave from 500 Hz to 20 kHz |
|---|---|
| Applied voltage of electronic component | 12.5 $V_{DC}$ + 2 $V_{PP}$ |

The electronic component of Embodiment 1 corresponds to the electronic component according to an embodiment described with reference to FIG. 2, and in this case, the first distance is approximately 1.5 times the second distance. The electronic component of Embodiment 2 corresponds to the electronic component according to another embodiment described with reference to FIG. 6, and in this case, the third distance is approximately 1.5 times the fourth distance. The electronic component of Embodiment 3 corresponds to the electronic component according to another embodiment described with reference to FIG. 7, and in this case, the fifth distance is approximately 1.5 times the sixth distance.

Figure 10A:
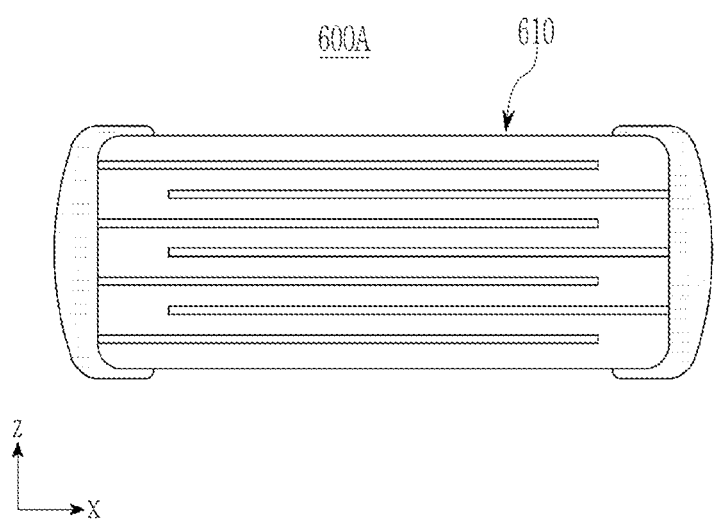
FIG. 10A is a cross-sectional view of an electronic component of Comparative Example 1.
Figure 10B:
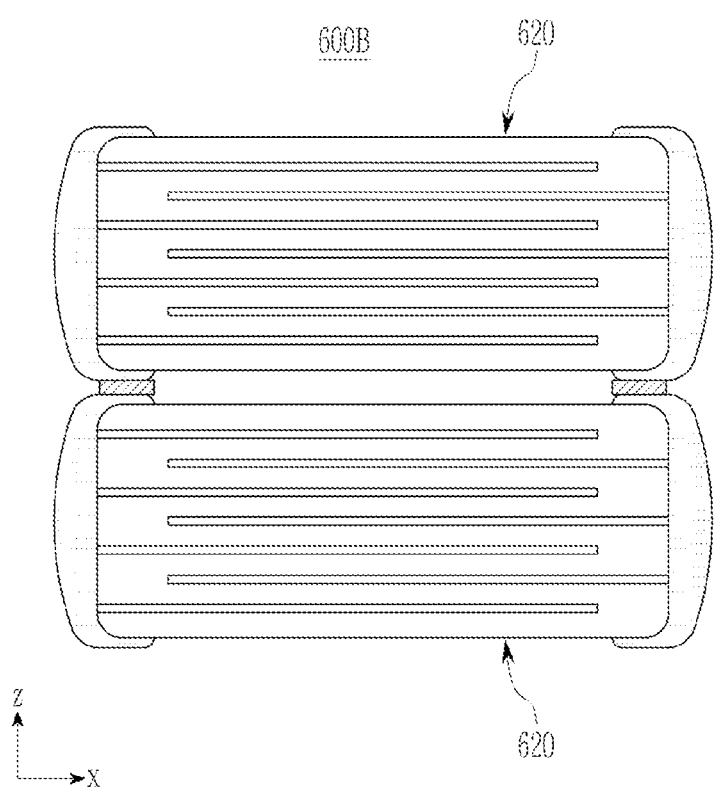
FIG. 10B is a cross-sectional view of an electronic component of Comparative Example 2.
Figure 10C:
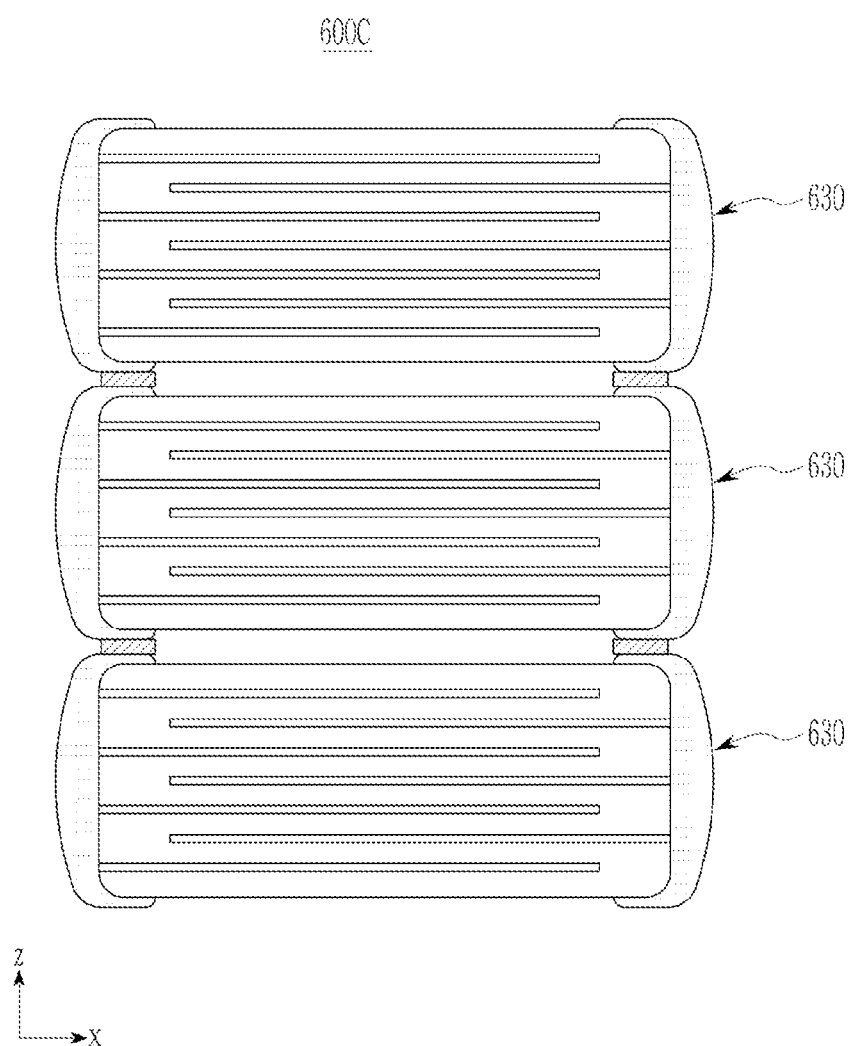
FIG. 10C is a cross-sectional view of an electronic component of Comparative Example 3.

FIG. 10A is a cross-sectional view of the electronic component of Comparative Example 1. FIG. 10B is a cross-sectional view of the electronic component of Comparative Example 2. FIG. 10C is a cross-sectional view of the electronic component of Comparative Example 3.

Referring to FIG. 10A to FIG. 10C, an electronic component 600A of Comparative Example 1 is formed of one capacitor 610, and a distance between a plurality of internal electrodes in the capacitor 610 is the same as the second distance described in the electronic component of Embodiment 1. An electronic component 600B of Comparative Example 2 includes two capacitors 620 disposed in the stacking direction, and each of the two capacitors 620 is identical to the capacitor 610 of Comparative Example 1. An electronic component 600C of Comparative Example 3 includes three capacitors 630 disposed in the stacking direction, and each of the three capacitors 630 is the same as the capacitor 610 of Comparative Example 1.

Figure 11:
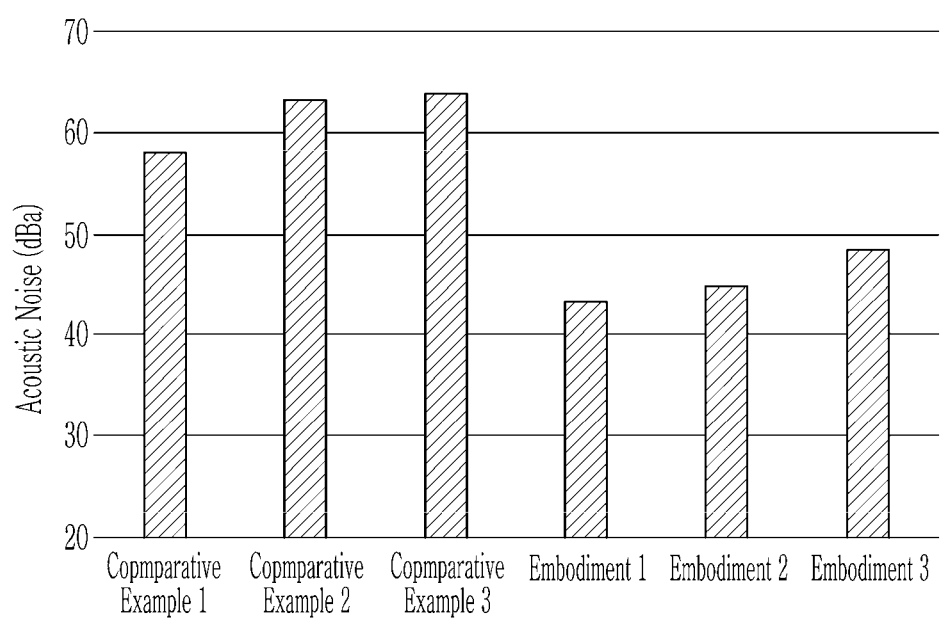
FIG. 11 is a graph that shows acoustic noise test results obtained using the measurement equipment illustrated in FIG. 9 for electronic components of Embodiments 1 to 3 and Comparative Examples 1 to 3.

FIG. 11 is a graph that shows acoustic noise test results for the electronic components of Embodiments 1 to 3 and the electronic components of Comparative Examples 1 to 3 using the measurement equipment of FIG. 9.

Referring to FIG. 11, in the experimental condition of Table 1, it can be confirmed that the acoustic noise shows the lowest value in Embodiment 1, and gradually increases sequentially in Embodiment 2 and Embodiment 3. Comparative Examples 1 to 3 showed higher acoustic noise than Embodiment 3, and it can be confirmed that the highest acoustic noise occurs in Comparative Example 3.

Although the preferred embodiment of the present disclosure has been described above, the present disclosure is not limited thereto, and it is possible to perform various modifications within the scope of the claims and the detailed description and accompanying drawings of the disclosure, and it is natural that this also belongs to the scope of the present disclosure.

What is claimed is:

1. An electronic component comprising:
   a first capacitor; and
   at least one second capacitor that is disposed on the first capacitor along a stacking direction,
   wherein each of the first capacitor and the at least one second capacitor includes a dielectric layer, and a plurality of internal electrodes spaced apart from each other with the dielectric layer interposed therebetween and disposed in the stacking direction, and
   along the stacking direction, a distance between the plurality of internal electrodes in the first capacitor is greater than a distance between the plurality of internal electrodes in the second capacitor.

2. The electronic component of claim 1, wherein:
   the dielectric layer included in the first capacitor has a lower permittivity than the dielectric layer included in the at least one second capacitor.

3. The electronic component of claim 1, wherein:
   the plurality of internal electrodes in each of the first capacitor and the at least one second capacitor include first internal electrodes and second internal electrodes alternately disposed in the stacking direction, and
   each of the first capacitor and the at least one second capacitor includes a first external electrode connected to the first internal electrodes and a second external electrode connected to the second internal electrodes.

4. The electronic component of claim 3, further comprising a board and a lead terminal that connects the first external electrode and the second external electrode included in the first capacitor to the board.

5. The electronic component of claim 3, further comprising a board and a pair of frame terminals connected to the board,
wherein the first external electrodes and the second external electrodes are coupled to the pair of frame terminals, and
the first capacitor is disposed at a distance from the board in the stacking direction.

6. The electronic component of claim 3, wherein:
the first external electrode included in the first capacitor is spaced apart from the first external electrode included in the at least one second capacitor.

7. The electronic component of claim 6, further comprising a board and a lead terminal that connects the first external electrode and the second external electrode included in the first capacitor to the board,
wherein the dielectric layer included in the first capacitor has a lower permittivity than the dielectric layer included in the at least one second capacitor.

8. The electronic component of claim 6, further comprising a board and a pair of frame terminals connected to the board,
wherein the first external electrodes and the second external electrodes are coupled to the pair of frame terminals,
the first capacitor is disposed at a distance from the board in the stacking direction, and
the dielectric layer included in the first capacitor has a lower permittivity than the dielectric layer included in the at least one second capacitor.

9. An electronic component comprising:
a plurality of capacitors disposed in a stacking direction; and
a connection portion that electrically connects the plurality of capacitors,
wherein each of the plurality of capacitors includes a dielectric layer and a plurality of internal electrodes spaced apart from each other with the dielectric layer interposed therebetween and disposed in the stacking direction;
along the stacking direction and among the plurality of capacitors, a distance between the plurality of internal electrodes in an uppermost capacitor is smaller than a distance between the plurality of internal electrodes in a remaining capacitor.

10. The electronic component of claim 9, wherein:
the remaining capacitor comprises a single capacitor.

11. The electronic component of claim 9, wherein:
the remaining capacitor comprises two or more capacitors.

12. The electronic component of claim 9, wherein:
the dielectric layer included in the uppermost capacitor has a higher permittivity than the dielectric layer included in the remaining capacitor.

13. The electronic component of claim 9, wherein:
the plurality of internal electrodes comprise first internal electrodes and second internal electrodes alternately disposed in the stacking direction,
each of the plurality of capacitors comprises a first external electrode connected to the first internal electrodes and a second external electrode connected to the second internal electrodes.

14. The electronic component of claim 13, further comprising a board and a lead terminal that connects the board to both the first external electrode and the second external electrode included in the capacitor, among the plurality of capacitors, closest to the board.

15. The electronic component of claim 13, further comprising a board and a pair of frame terminals connected to the board,
wherein the first external electrodes and the second external electrodes are coupled to a pair of frame terminals, and
among the plurality of capacitors, the capacitor closest to the board is disposed at a distance from the board in the stacking direction.

16. The electronic component of claim 14, wherein the connection portion physically separates the first external electrode included in the capacitor, among the plurality of capacitors, closest to the board from the first external electrode included in a remaining capacitor.

17. The electronic component of claim 15, wherein the connection portion physically separates the first external electrode included in the capacitor, among the plurality of capacitors, closest to the board from the first external electrode included in a remaining capacitor.

* * * * *